Jan. 7, 1947.  J. A. COMSTOCK  2,413,953
CASING FOR ELECTRICAL DEVICES
Filed Feb. 21, 1945  2 Sheets-Sheet 1

INVENTOR.
James A. Comstock
BY
Woodling and Krost
attys.

Jan. 7, 1947.　　　　J. A. COMSTOCK　　　2,413,953
CASING FOR ELECTRICAL DEVICES
Filed Feb. 21, 1945　　　2 Sheets-Sheet 2

INVENTOR.
BY James A. Comstock
Woodling and Krost
attys

Patented Jan. 7, 1947

2,413,953

UNITED STATES PATENT OFFICE 2,413,953

CASING FOR ELECTRICAL DEVICES

James A. Comstock, Clyde, N. Y., assignor, by mesne assignments to Acme Electric Corporation, a corporation of New York Application February 21, 1945, Serial No. 579,129

5 Claims. (Cl. 174—52)

My invention relates to a case for electrical devices in general, and more particularly to a case for an electrical device having lead wires extending therefrom such, for example as transformers, reactors and ballast. In this application, the invention will be described in conjunction with a ballast, and thus the term "ballast" hereinafter used shall be interpreted as including the transformer and a reactor or other devices.

An object of my invention is to provide a case for an electrical circuit ballast which is adaptable to allow the wires of the ballast to extend from the case in either of two directions and to permit the wires to be moved from one position to the other.

Another object of my invention is to provide a case for an electrical circuit ballast which is adaptable to allow the wires of the ballast to extend from the case in either an outwardly or downwardly direction and to permit the wires to be moved from one position to the other.

Another object of my invention is to provide a case for an electrical circuit ballast having lead wires, the case having a continuous opening extending around a corner thereof to permit a selection of positions for the lead wires to extend therefrom whereby the ballast may be used in either enclosed conduits, or positioned on top or on the outside of a conduit.

Another object of my invention is to provide a case for an electrical device which is adapted to be secured to a surface by screws or the like, and which is provided with a hook-shaped opening for the lead wires of the device, whereby the wires may be moved away from the screw while the screw is being tightened.

Other objects and a fuller understanding of my invention may be had by referring to the following description and claims, taken in conjunction with the accompanying drawings, in which:

There are two standard methods of mounting fluorescent lighting ballast cases or boxes. One method is to enclose the ballast case within a top housing on the reflector. In this type of mounting, the lead wires are normally extended through the ballast case at the end of the case. The second method of mounting is called "exposed mounting" and employs a ballast case from which the lead lines are extended through the bottom. The ballast case is mounted on top of the top housing in an exposed position to allow for a greater dissipation of heat. The lead wires extend from the bottom of the ballast case and into the top housing of the fixture which encloses the distributing wires to the ends of the fluorescent tube.

It is standard practice to provide two types of ballast cases for these two needs. If an enclosed mounting is desired, a "standard" ballast case is furnished in which the leads extend from the end of the case. If the ballast case is to be mounted in the exposed mounting position, the "bottom" lead type case is furnished. It will readily be seen that a double supply of ballast cases must be kept on hand at all times with this type of practice in order to meet the needs. My improved ballast case, on the other hand, provides a continuous slot extending along two angularly joined walls of the case in order that the lead wires may be placed in either of the two required positions, and may readily be moved from one position to the other. Therefore, instead of double supply of cases, only one supply of cases need be carried in stock and these may be adapted to the particular needs.

Further, the standard practice of securing these ballast cases is to provide a flange at either end of the case with a slot therein to be engaged by a screw, or similar fastening device. It has been found, that with the ballast cases of the "standard type" the wires often extend from the case in a position directly above the described slot, and therefore interfere with the tightening or the fastening means. Also, the wires are in a position whereby they may be damaged when the screw is inserted or removed and therefore, produce a fire hazard. My invention also provides for positioning the lead wires a lateral distance away from the securing means, and therefore, they do not interfere with the tightening of the screw, or become damaged during the tightening operation.

Figure 1:
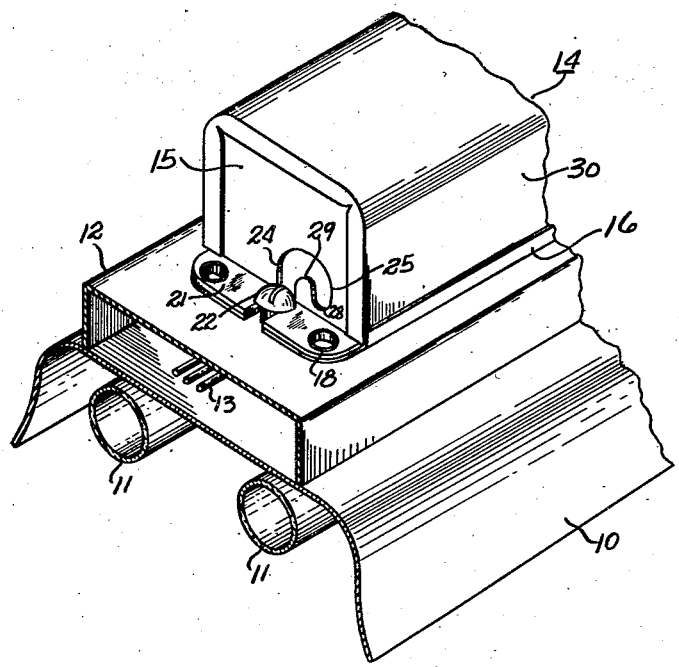
Figure 1 is a broken away view of a fluorescent lighting unit employing a top housing channel for lead wires and a ballast unit mounted on top.

With reference to the Figure 1, I illustrate a broken away section of a standard overhead fluorescent illuminating unit in which the reference character 10 indicates the reflector that shields a suitable number of fluorescent tubes 11. Mounted on top of the reflector 10, is a top housing 12 which is employed to serve as a conduit for the lead wires 13. These lead wires 13 extend to the end of the reflector unit (not shown) and to other auxiliary equipment employed with the unit. In the Figure 1, I illustrate my improved ballast case 14 as being mounted in the exposed mounting position, therefore the wires from the case 14 extend from the bottom of the case and are not illustrated. The case 14 is secured to the top housing 12 by means of suitable screws 22.

Figure 2:
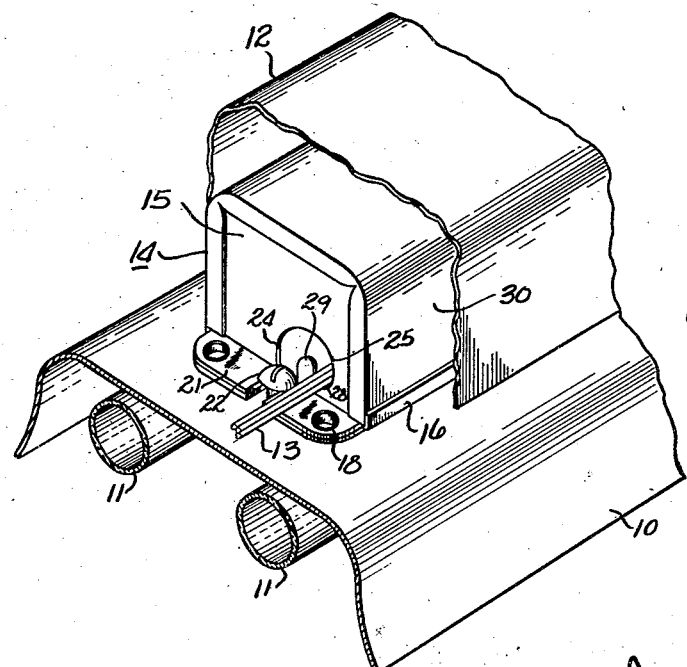
Figure 2 is a broken away view of a fluorescent lighting unit employing a top housing channel which encloses both the wiring and the ballast unit.
Figure 4:
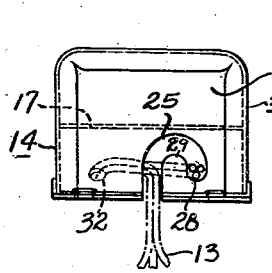
Figure 4 is an view of Figure 3.
Figure 3:
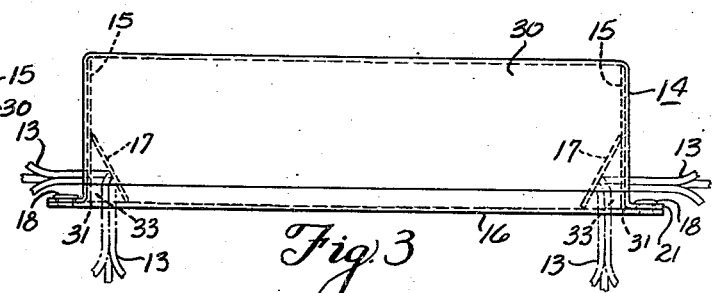
Figure 3 is a side view of a ballast case embodying the features of my invention and illustrating the ballast lead wires extending from the ends of the case as positioned when the core is enclosed, and in phantom the lead wires are illustrated in the position assumed when the case is mounted on top of the housing conduit.
Figure 5:
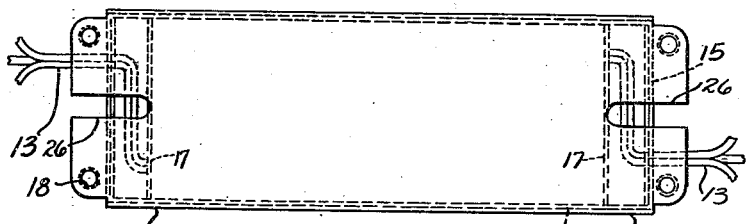
Figure 5 is a bottom view of Figure 3.

The Figure 2 illustrates the enclosed mounting method, in which the ballast case 14 is secured directly to the top of the reflector 10 by means of screws 22, and is enclosed by the top housing 12. The lead wires 13, in this case, are illustrated extending from the end of the case 14. In either the mounting illustrated in the Figure 1 or in the mounting illustrated in the Figure 2, the wires extend through a continuous slot 24, of which only a hook portion 25 is illustrated, but which extends around the end 15 of the case. It will be noted with reference to the Figure 2, that the lead wires 13 are positioned at the terminus 28 of the hook portion 25, and are held against lateral movement toward the screw 22 by means of a tab 29.

Referring to the Figures 3 to 6, I illustrate the specific details of one embodiment of my invention. This embodiment comprises generally three longitudinal walls 30, two end walls 15, and a closure plate 16. Securing flanges 21 extend substantially perpendicularly from the end walls 15 and serve to hold the closure plate 16 and also serve as securing flanges to be contacted by screws 22. The flanges 21 are perforated by openings or holes 19, and the closure plate 16 is provided with projecting surfaces 18 which extend into and through the holes 19 and interlock therewith.

Slots 26 are provided in the closure plate 16 substantially along the center line thereof, and slots 27 are provided in the flanges 21. The slots 27 divide the flanges 21 intermediate their ends. In fact, each of the flanges 21 may be considered as two separate flanges separated by a space therebetween which constitutes the slot 27. The hook-shaped slots 25 in the end walls 15 are disposed to join or register with the slots 26 and the slots 27 at corners 31. It will be seen therefore, that for each end of the case, the joined slots in the angularly disposed walls which may be referred to as slot portions, provide a continuous slot, port or opening extending around the corner through which the ballast lead wires 13 may extend. In these illustrations, the lead wires 13 are shown in full lines extending through the hook-shaped slots 25, and are illustrated in dot dash lines extending through the closure plate slots 26. These two positions are the far extreme through which the lead wires 13 may be moved, and are the two normal working positions which the wires may assume.

Figure 6:
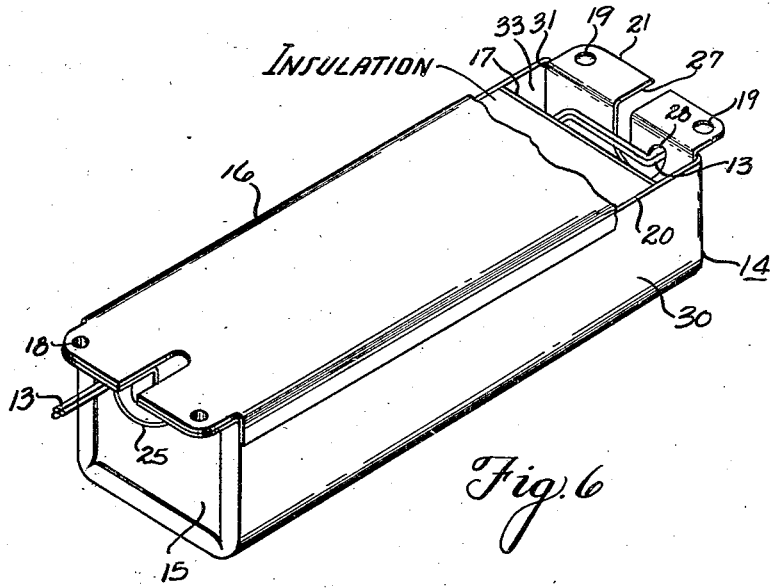
Figure 6 is a perspective view of my improved case with the enclosure plate broken away at one end.

With reference now to the Figure 6, the broken away portion of the closure plate 16 reveals the interior of the ballast box at one end thereof. When the electrical apparatus is inserted within the metal box during manufacture, a small dam 17 is placed to slope from a point beyond the apex of the hook-shaped slot substantially as illustrated. A plastic material 20, such as a suitable insulating compound, is poured into the case and fills and surrounds the electrical equipment. However, this material 20 is held away from the region adjacent the corner 31 by means of the dam 17 and therefore, a space 33 is provided. Lead wires 13 extend through an opening 32 into the space 33 provided by the dam 17 and thereafter pass out through the continuous slot 24. The space 33 provided by the dam 17, therefore permits the lead wires 13 enough freedom of movement within the case so that they may be moved from one end of the continuous slot 24 to the other.

In operation, the case may be removed from stock with the wires 13 extending from any portion of the continuous slot 24, and the wires may be moved to the plane desired dependent upon the need. In the event that the wires 13 are to extend in the "standard" direction, that is, from the end walls 15 of the case, the wires are positioned as described, near the terminus 28 of the hook slot 25. The wires 13 will stay in place near the terminus 28, because the tab 29 opposes lateral movement thereof. The screw 22 may then be turned without damage to the wires 13. On the other hand, if the wires 13 are to extend from the bottom of the case, as in the "exposed mounting," the wires 13 are moved into the slot 26, and thereafter will not be in position to interfere with the operator of the screws 22.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A case for an electrical device having at least a lead wire disposed to extend from the said electrical device to the exterior of said case, said case comprising at least a first and a second angularly disposed wall meeting at a corner, a first slot portion in said first wall extending to the said corner and a second slot portion in said second wall extending to the said corner, said slot portions joining at said corner to form a continuous slot through which the said lead wire may extend, said lead wire being extendable in one direction from the case through one of the said slot portions and being extendable in a second direction from the case through the other of said slot portions, said wire being movable in said slot from one position to the other to change the direction in which it extends from the case, at least one of said slot portions being hook shaped and having a terminus disposed in a lateral direction from the place where the slot portions join, a portion of the case wall on one side of the said hook-shaped slot portion forming a tab between the said terminus and the place where the slot portions join, whereby the tab opposes the lateral movement of the lead wire toward the place where the slot portions join when the lead wire is placed in the hook-shaped portion near the terminus thereof.

2. A case for an electrical device having at least a lead wire disposed to extend from the said electrical device to the exterior of said case, said case comprising at least a first and a second angularly disposed wall meeting at a corner, a securing flange extending from said corner disposed perpendicular to said first wall and substantially in the plane of the second wall, a first slot portion in said first wall extending to the said corner and a second slot portion in said second wall extending to the said corner, said slot portions joining at said corner to form a continuous slot through which the said lead wire may extend, the said securing flange being divided and forming a flange slot, the said flange slot extending to said corner and joining the said continuous slot, the edge of the said flange slot being disposed to be engaged by securing means, said lead wire being extendable in one direction from the case through one of the said slot portions and being extendable in a second direction from the case through the other of said slot portions, said wire being movable in said continuous slot and through said flange slot from one position to the other to change the direction in which it extends from the case, at least the said first wall slot portion being hook-shaped and having a terminus disposed in a lateral direction from the place where the slot portions and the flange slot join, a portion of the said first wall on one side of the said hook-shaped slot portion forming a tab between the said terminus and the place where the slot portions join, whereby the tab opposes the lateral movement of the lead wire toward the place where the slot portions join when the lead wire is placed in the hook-shaped portion near the terminus thereof and thereby positions the said lead wire away from the said securing means.

3. A case for an electrical device having at least a lead wire disposed to extend from the said electrical device to the exterior of said case, said case comprising at least a first and a second angularly disposed wall meeting at a corner, a securing flange extending from said corner disposed perpendicular to said first wall and substantially in the plane of the second wall, a first slot portion in said first wall extending to the said corner and a second slot portion in said second wall extending to the said corner, said slot portions joining at said corner to form a continuous slot through which the said lead wire may extend, the said securing flange being divided and forming a flange slot, the said flange slot extending to said corner and joining the said continuous slot, the edge of said flange slot being disposed to be engaged by securing means, said electrical device and the interior of said case defining a space therebetween in the region of the said corner, said lead wire being extendable in one direction from the case through one of the said slot portions and being extendable in a second direction from the case through the other of said slot portions, said wire being movable in said space and said continuous slot and through said flange slot from one position to the other to change the direction in which it extends from the case, at least the said first wall slot portions being hook-shaped and having a terminus disposed in a lateral direction from the place where the slot portions and the flange slot join, a portion of the said first wall on one side of the said hook-shaped slot portion forming a tab between the said terminus and the place where the slot portions join, whereby the tab opposes the lateral movement of the lead wire toward the place where the slot portions join when the lead wire is placed in the hook-shaped portion near the terminus thereof and thereby positions the said lead wire away from the said securing means.

4. A case for an electrical device having at least a lead wire disposed to extend from the said electrical device to the exterior of said case, said case comprising at least a first and second angularly disposed wall meeting at a corner, a securing flange extending from said corner disposed perpendicularly to said first wall and substantially in the plane of the second wall, a wall slot in said first wall through which the said lead wire may extend, the said securing flange being divided and forming a flange slot, the said flange slot extending to said corner and joining the said wall slot, the edges of said flange slot being disposed to be engaged by securing means, the said wall slot being hook-shaped and having a terminus disposed in a lateral direction from the place where the wall slot and the flange slot join, said lead wire being extendable through the said wall slot and being movable in said wall slot from one position to the other, a portion of the said wall on one side of the said hook-shaped slot forming a tab between the said terminus and the place where the wall slot joins the flange slot, whereby the tab opposes the lateral movement of the lead wires toward the place where the wall slot joins the flange slot when the lead wire is placed in the hook-shaped portion near the terminus thereof and thereby positions the said lead wire away from the said securing means.

5. A case for an electrical device having lead wires disposed to extend from the said electrical device to the exterior of said case, said case having two end walls and being closed by a closure plate, said end walls and closure plate comprising angularly disposed walls meeting at opposite corners, a securing flange extending from each of said corners and disposed perpendicular to said end walls at said corners and substantially in the plane of the closure plate, each end wall having a first slot portion extending to its respective corner and the closure plate having two separate slots positioned at extremities thereof and extending to the said corners, each said end wall slot joining a closure plate slot at the corners to form continuous slots through which the said lead wires may extend, each said securing flange being divided and forming a flange slot, each said flange slot extending to its respective corner and joining the said continuous slot, the edges of said flange slots being disposed to be engaged by securing means, said electrical device and the interior of said case defining spaces therebetween in the region of the corners, said lead wires being extendable in one direction from the case through the closure plate slots and being extendable in a second direction from the case through the end wall slot portions, said wires being movable in said spaces and said continuous slots and through said flange slots from one position to the other to change the direction in which they extend from the case, at least the end wall slot portions being hooked-shaped, said hooked-shaped portions having a terminus disposed in a lateral direction from the place where the hook-shaped slot portion and the flange slot join, a portion of the said end wall on one side of the said hook-shaped slot portion forming a tab between the said terminus and the place where the slot portions join, whereby the tab opposes the lateral movement of the lead wires toward the place where the slot portions join when the lead wire is placed in the hook-shaped portion near the terminus thereof and thereby positions the said lead wires away from the said securing means.

JAMES A. COMSTOCK.